Clifford E. Ashline
INVENTOR.

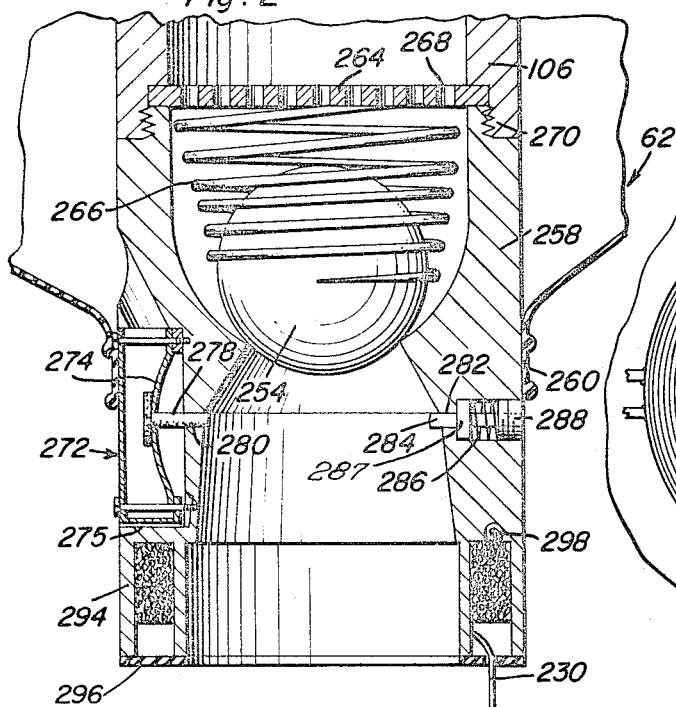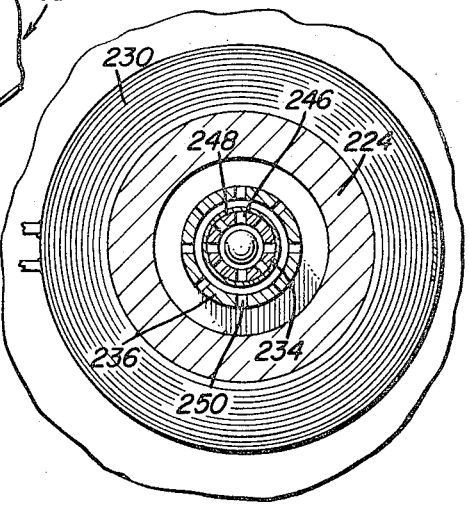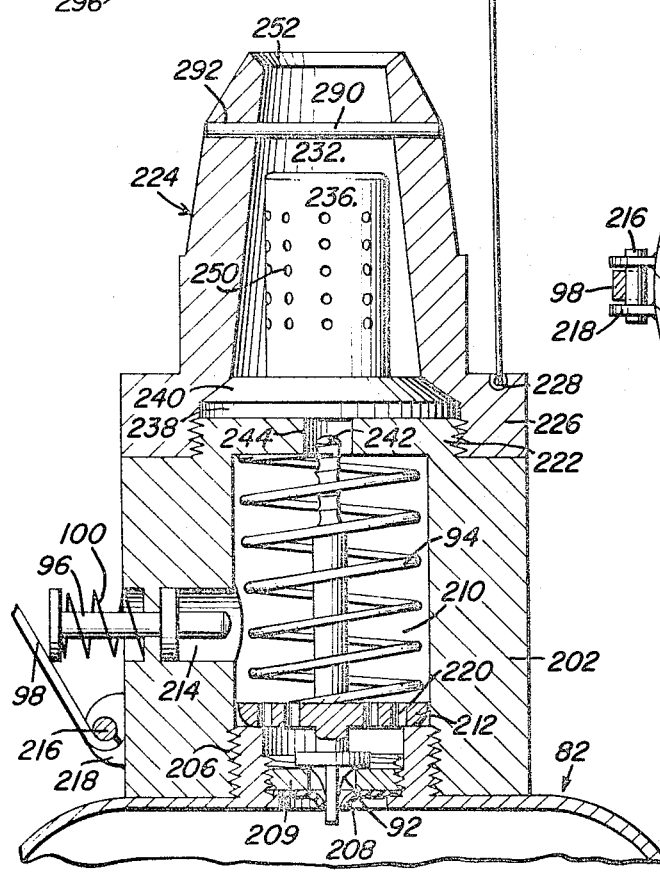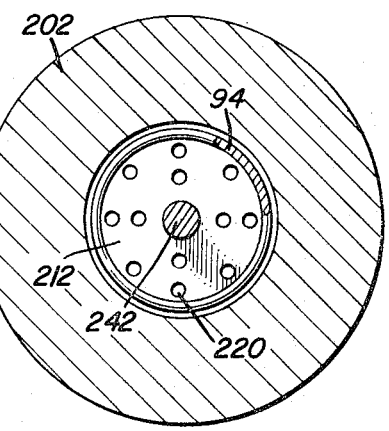

United States Patent Office 3,332,390
Patented July 25, 1967

3,332,390
INFLATING AND SEPARATING MECHANISM FOR IMPACT RESPONSIVE DISTRESS SIGNAL DEVICE
Clifford E. Ashline, Harrisburg, Pa.
(4600 Duke St., Apt. 1309, Alexandria, Va. 22304)
Filed Jan. 22, 1964, Ser. No. 339,554
3 Claims. (Cl. 116—124)

This invention relates to an improvement over the apparatus disclosed in my prior copending U.S. application Ser. No. 275,087, filed Apr. 23, 1963 now U.S. Patent No. 3,253,573. The improvement of the present invention relates to triggered inflation and separation of an inflatable balloon from an inflation gas cylinder ejected with the balloon in folding condition from a vehicle such as an aircraft in response to impact.

It is therefore a primary object of the present invention to provide an improved method and mechanism for effecting inflation of a distress balloon and separation thereof from the inflating mechanism.

In accordance with the foregoing object, the present invention involves a relatively compact and reliably operative mechanism for hoding the inflation balloon in a deflated condition, attached to the inflating mechanism. The inflating mechanism is triggered by release of a puncturing element to open the outlet of a pressure cylinder containing an inert inflation gas which flows through flow restricting passages into the balloon for inflation thereof. Only when the ballon is inflated to the proper pressure, is it released from the inflation mechanism to which it remains anchored by an unwinding aerial cable held in folded condition below the inflow tube of the balloon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a longitudinal sectional view showing the balloon assembly separated from the inflation mechanism.

FIGURE 5 is a transverse sectional view taken through a plane indicated by section line 5—5 in FIGURE 1.

FIGURE 6 is a sectional view taken through a plane indicated by section line 6—6 in FIGURE 1.

Figure 1:
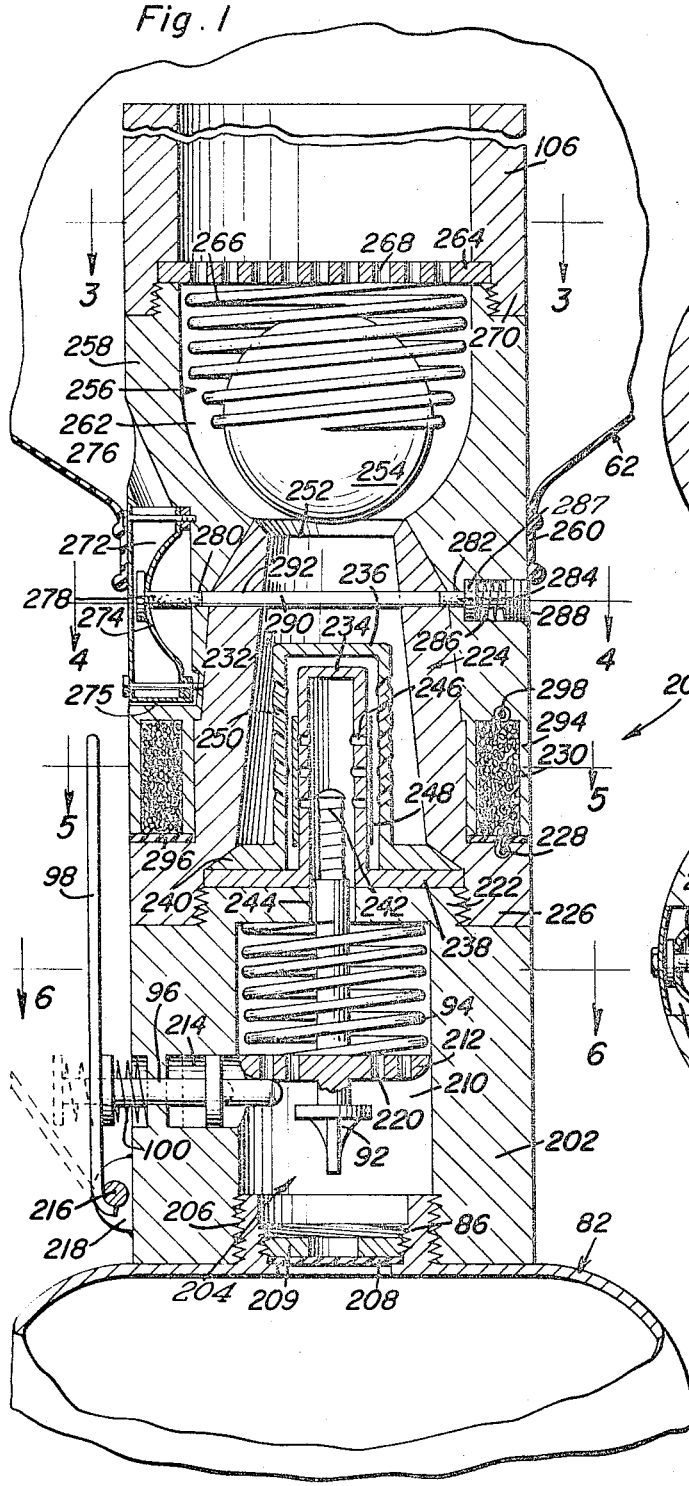
FIGURE 1 is a longitudinal sectional view through a portion of an impact responsive distress signal device showing the improved inflation and separating mechanism.
Figure 3:
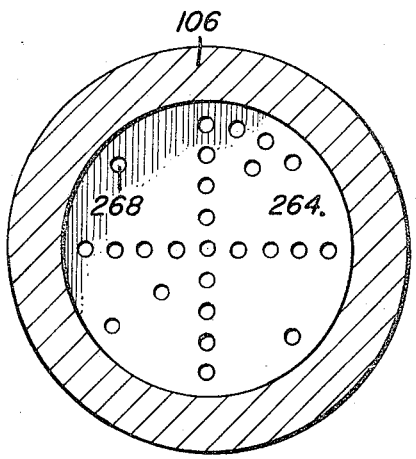
FIGURE 3 is a transverse sectional view taken through a plane indicated by section line 3—3 in FIGURE 1.
Figure 4:
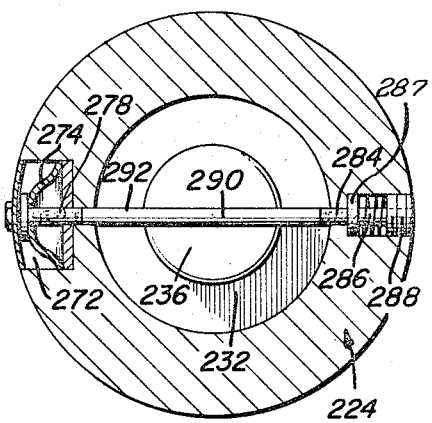
FIGURE 4 is a transverse sectional view taken through a plane indicated by section line 4—4 in FIGURE 1.

Referring now to drawings in detail, it will be observed that the inflation and separating mechanism generally referred to by reference numeral 200 is disposed between the pressure cylinder 82 containing an inert inflation gas such as helium and an inflatable balloon assembly 62. The inflation gas cylinder 82 and balloon assembly 62 form part of the impact responsive distress signal device disclosed in the aforementioned prior copending application. Both the cylinder 82 and the balloon assembly 62 in a deflated condition are attached to each other when ejected or launched at which time the mechanism 200 is triggered into action by release of the trigger lever 98 held in the position illustrated by solid line in FIGURE 1 in any suitable manner, such as disclosed in my aforementioned prior copending application. When released, the trigger lever 98 is displaced to the position illustrated by dotted line in FIGURE 1 by the bias of spring 100. The spring 100 is therefore seated on the holding pin 96 reacting between the trigger lever 98 and the supporting body 202 mounted on and fixed to the pressure cylinder 82.

The supporting body 202 mounts the various components of a puncturing assembly 204 operative upon release of the trigger lever 98 to release the gas under pressure from the cylinder 82. The supporting body 202 is therefore provided with an internally threaded portion 206 adjacent its lower end for mounting on the externally threaded outlet portion 86 of the cylinder 82. The pressurized gas within the cylinder is held therewithin by means of a frangible disc 208 held in place by retainer plug 209 and adapted to be ruptured by the piercing element 92, as shown in FIGURE 2. The piercing element 92 is slidably mounted within an axial chamber 210 formed within the body 202 in alignment with the outlet portion 86 of the cylinder 82. A disk portion 212 is affixed to or integral with the piercing element as a result of which it is biased downwardly by the spring 94 reacting against the disk portion 212. The puncture element 92 is held however in a retracted position against the bias of spring 94 by the holding pin 96 projecting into the chamber 210 from the transverse bore portion 214. The trigger lever 98 is therefore pivotably mounted on the body 202 by the pivot pin 216 supported between the ears 218 projecting from the body 202. It will therefore be apparent, that upon retraction of the holding pin 96, the piercing element 92 will be displaced to the position illustrated in FIGURE 2 permitting discharge of gas under pressure from cylinder 82 into chamber 210 through the apertures 220 in the disk portion 212.

The body 202 is provided with an externally threaded portion 222 at its upper end for fixedly mounting thereon, a supporting conduit section 224 having a lower internally threaded annular flange portion 226. The flange portion 226 is provided with an anchor 228 to which one end of an aerial cable 230 is connected, the aerial cable being confined within an annular space encircling the supporting conduit section 224 above the lower flange portion 226. Formed within the supporting conduit section in axial alignment with the chamber 210, is an upwardly converging passage 232. Mounted in axial alignment within the passage 232, is a flow restriction cap 234 enclosed by a fog cap 236. The restriction cap 234 therefore includes a lower base portion 238 seated on the externally threaded portion 222 of the body member 202 so as to lock the cap in assembled position between the body 202 and the beveled base portion 240 of the enclosing fog cap 236. An upper stem portion 242 secured to the piercing element 92 extends upwardly into the flow restricting cap 234 through a connecting bore 244 between the chamber 210 and the passage 232 in the supporting section 224. Gas under pressure will therefore flow upwardly from the chamber 210 into the flow restriction cap and be discharged through orifices 246 formed in the flow restriction cap, said orifices being covered by a resilient, expansible sleeve 248. Gas under pressure escaping through the orifices 246 after causing expansion of the resilient sleeve 248, will pass through the upwardly inclined orifice passages 250 in the fog cap 236 so as to enter the passage 232 in a fog condition. The gas will then proceed upwardly through the outlet at the uper end of the passage 232 which is in the form of a valve seat 252 for the ball element 254 of a one-way check valve assembly 256.

The one-way check valve assembly is housed within a tubular member 258 to which the balloon assembly 62 is secured at its inlet portion 260. The member 258 is formed with a valve chamber 262 within which the ball element 254 is located, the valve chamber being closed by an orifice plate 264 and seating a return spring 266 which biases the ball element 254 to a seated position on the valve seat 252. Gas under pressure within the upwardly converging passage 232 will therefore unseat the ball valve element 254 against the bias of return spring 266 so as to enter the valve chamber 256 from which it is discharged through the orifices 268 in the orifice plate into the vortical flow tube 106. The vortical flow tube 106 is therefore provided with an internally threaded portion 270 at its lower end so as to secure it to the tubular member 258 and lock the orifice plate 264 in assembled position therebetween.

When the pressure within the balloon 62 rises to the proper value, the pressure within the release chamber 272 actuates the diaphragm element 274 located therewithin. The release chamber is formed in the member 258 on one side of the diaphragm and is in fluid communication with the balloon through the passage 276. The other side of the diaphragm 274 is vented by vent passage 275. Connected to the diaphragm element 274 is a release pin 278 which projects through a bore 280 formed in the body member 258, said bore being aligned with a transversely opposite bore 282 formed in the member 258. Accordingly, the release pin 278 is aligned with a retaining pin 284 slidably mounted within the bore 282 and held in the position illustrated in FIGURE 1 by the bias of a spring 286. The spring reacts between the disc 287 on pin 284 and the adjustably positioned guide plug 288 slidably receiving the end of the pin 284. The release pin 278 and retaining pin 284 will therefore be aligned with a locking pin 290 disposed within a transverse bore 292 formed in the supporting conduit section 224 on which the body member 258 is seated to form two interconnected passage sections as shown in FIGURE 1. The tubular member 258 is therefore provided with a lower annular cavity portion 294 seated on the flange portion 226 to house the folded cable 230, the upper end of which is connected to anchor 298. The lower end of the cable extends through an opening in the plastic sealing ring 296 for connection to the anchor 228. It will therefore be apparent, that when the diaphragm element 274 is actuated and displaces the release pin 278 inwardly against the bias of the spring 286, the locking pin 290 is axially displaced completely into the transverse bore 292 so as to unlock the tubular member 258 from the supporting body member 224. The inflated balloon 62 may then be separated from the supporting body member 224 or the mechanism 200 of which it is a part. The folded cable 230 will be carried upwardly with the balloon to its full length in order to limit the elevation of the balloon device inasmuch as the cable is anchored between the anchors 228 and 298 on the supporting conduit section 224 and body member 258 respectively.

From the foregoing description, the construction, operation and utility of the inflating and separating mechanism will be apparent. It will therefore be appreciated, that the mechanism is compact in size, and reliable in operation. Not only in the mechanism operative to effect release of gas under pressure from the inflation gas cylinder but conditions the gas for proper inflation of the balloon device releasably attached thereto. Only when the pressure within the balloon device reaches the proper value will it be unlocked from the mechanism so that it may be separated therefrom at which time the pressure within the balloon and the return spring 266 reseat the ball element 254 to seal the pressure therewithin. Also, a more convenient space is provided for the folded aerial cable less likely to be fouled when the balloon device separates from the inflating mechanism.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an inflatable device and a source of gas under pressure for inflation thereof, means for releasably connecting said inflatable device to the source of gas and conducting said gas into the device comprising, two passage members respectively secured to the source of gas and the inflatable device, means on said two passage members for seating each other in axial alignment with the source of gas, one-way valve means mounted by one of said two passage members for blocking flow of gas from the inflatable device into the other of said two passage members, displaceable locking means engageable with said members for holding the members seated on each other, and means responsive to a predetermined pressure in the inflatable device for displacing the locking means to permit separation of the two passage members, said displaceable locking means comprising, a locking pin slidably mounted by said one of the two passage members in engagement with a release pin connected to a pressure responsive means and a retaining pin mounted in the other of staid two passage members when seated on said one of the two passage members, and means biasing the retaining pin and the locking pin engaged therewith to positions interconnecting said passage members.

2. The combination of claim 1 wherein said one of the two passage members includes a housing portion seated in coaxial relation on the other of the two passage members, and a cable disposed in folded condition within said housing portion anchored at opposite ends to said passage members respectively.

3. The combination of claim 1 wherein said pressure responsive means comprises a chamber formed in said other of the two passage members in fluid communication with the inflatable device, and a diaphragm element mounted in the chamber and connected to the release pin for displacing the locking pin and the retaining pin against the bias of the biasing means.

References Cited
UNITED STATES PATENTS

| | | | |
|---|---|---|---|
| 1,706,051 | 3/1929 | Auchincloss | 220—55.3 |
| 1,836,495 | 12/1931 | Paulson | 116—124 |
| 2,192,450 | 3/1940 | Miller | 116—124 |
| 2,559,918 | 7/1951 | Grieb | 116—124 |
| 2,778,332 | 1/1957 | Talbot | 116—124 |
| 2,786,599 | 3/1957 | Higbee | 222—5 |
| 2,821,725 | 2/1958 | Harper | 9—9 |
| 2,923,917 | 2/1960 | McPherson | 340—27 |
| 3,035,285 | 5/1962 | Squires | 9—9 |
| 3,123,842 | 3/1964 | Oeland et al. | 9—9 |
| 3,145,573 | 8/1964 | Hebenstreit | 9—319 |
| 3,147,885 | 9/1964 | Sheridan | 116—124 |
| 3,156,933 | 11/1964 | Brooks | 9—9 |
| 3,175,525 | 3/1965 | Vries | 9—9 |

LOUIS J. CAPOZI, *Primary Examiner.*